United States Patent [19]

Ham

[11] 3,836,178

[45] Sept. 17, 1974

[54] DEMOUNTABLE LOAD CARRYING BODIES

[75] Inventor: Rowland Herbert Ham, Charvill, England

[73] Assignee: Ronway Engineering Company Limited, Southhall, Middlesex, England

[22] Filed: Dec. 11, 1972

[21] Appl. No.: 313,667

[30] Foreign Application Priority Data
Dec. 13, 1971 Great Britain.................... 57837/71

[52] U.S. Cl. ............... 280/415 B, 180/14, 280/408, 280/423 R, 296/23 MC
[51] Int. Cl. ........................ B62d 53/04, B62d 53/06
[58] Field of Search ............ 280/415 B, 423 R, 408, 280/440; 180/14; 296/23 MC

[56] References Cited
UNITED STATES PATENTS

| | | | |
|---|---|---|---|
| 2,970,004 | 1/1961 | Ratner et al. ................... | 280/423 R |
| 3,137,515 | 6/1964 | Masser............................. | 280/440 |
| 3,163,306 | 12/1964 | Bennett et al................ | 280/423 R X |
| 3,208,770 | 9/1965 | Freitas ............................. | 280/440 |
| 3,237,966 | 3/1966 | Ayers.............................. | 280/423 R X |
| 3,411,600 | 11/1968 | Loving et al.................... | 180/14 |
| 3,586,119 | 6/1971 | Greer.............................. | 180/14 |
| 3,718,346 | 2/1973 | Self et al. ....................... | 280/415 B |

*Primary Examiner*—Leo Friaglia

[57] ABSTRACT

A kit of parts for converting a wheeled vehicle chassis for mounting raised loads thereon, comprising a frame with spaced longitudinal members mountable longitudinally of the chassis, a fifth wheel coupling plate between the longitudinal members in the mid portion between their ends, load guide means at the rear end of the longitudinal members, and a damping device at the front end of the frame, such that when assembled on the vehicle chassis enables the chassis to be moved longitudinally beneath a raised load until a kingpin on the mid underside portion of the load engages the fifth wheel coupling plate and a member at the rear of the load engages the guide means while the damping device is engaged by the forward part of the load. A second kit may be used with said kit, comprising a load supporting frame having spaced longitudinal members rigidly connected by front and rear transoms, a kingpin supported on said members, rollers on the forward ends of said members to ride on the longitudinal frame members of said first kit, and retractable leg supports at the forward and rear ends of said members of said second kit, said front transom cooperating with said damping device and said rear transom being connected to a member engaging said guide means.

7 Claims, 4 Drawing Figures

PATENTED SEP 17 1974

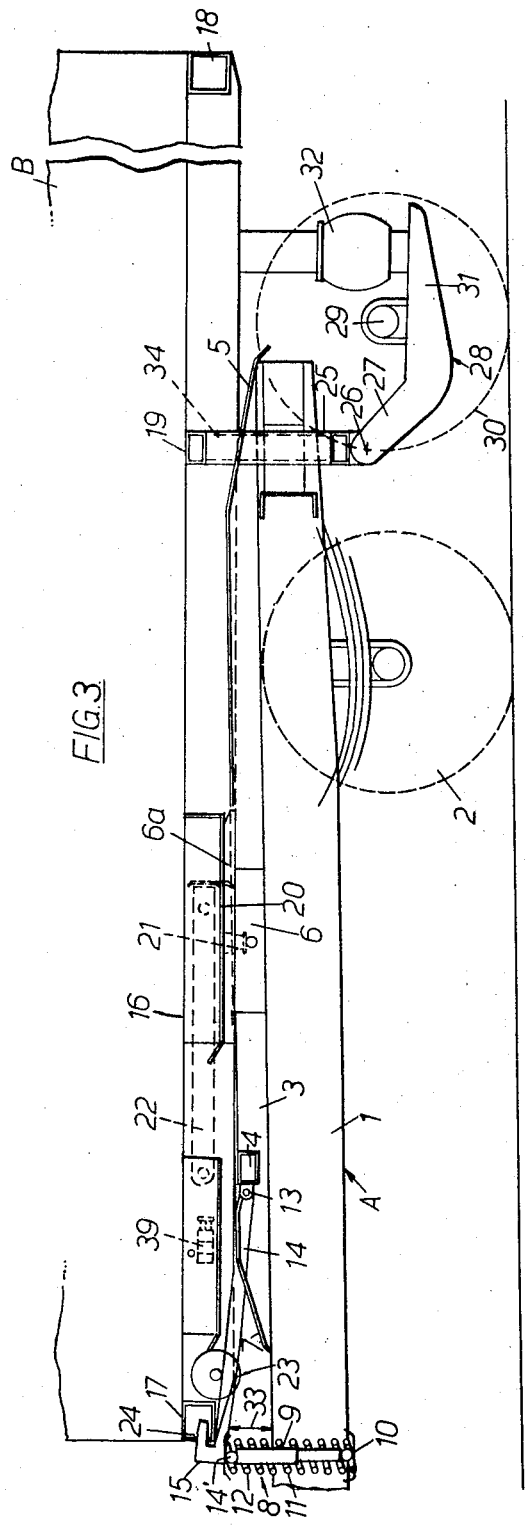
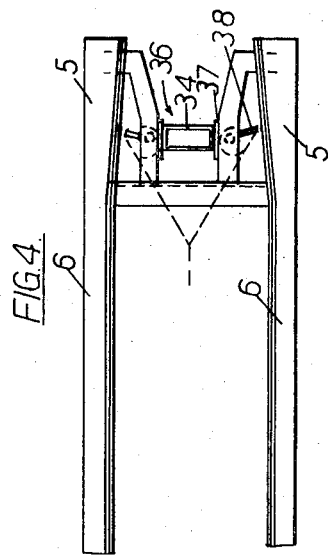

DEMOUNTABLE LOAD CARRYING BODIES

BACKGROUND OF THE INVENTION

1. Field of the Invention

This invention relates to load carrying vehicles with means for mounting raised loads thereon and to conversion kits for use in adapting existing load carrying vehicles for mounting loads thereon in accordance with this invention.

2. Description of Prior Art

Load carrying vehicles are known in which a wheeled chassis can be moved on its road wheels beneath a raised load supported on legs with jacking means for taking the weight of the load to enable the load legs to be retracted whereby the weight of the load can be transferred to the vehicle chassis for transport thereby.

The main object of the present invention is to provide an improved vehicle for this purpose and a conversion kit by which existing vehicle chassis can be adapted for this purpose.

SUMMARY

According to the present invention a kit of parts or assembly for use in converting a wheeled vehicle chassis for mounting thereon loads raised above the ground which comprises a frame, including spaced longitudinal members, mountable longitudinally of the wheeled chassis, a fifth wheel coupling plate between the longitudinal members in the mid portion between their ends, load guide means at the rear end of the longitudinal members, and a damping device at the front end of the frame, the frame when mounted on the chassis enabling the vehicle to be moved longitudinally beneath the raised loads until a fifth wheel pin on the mid underside portion of the load engages in the fifth wheel coupling plate with a member at the rear of the load engaged in the guide means, and the damping device is engaged in the forward part of the load.

Preferably the damping device comprises a resilient device securable with respect to the frame and upwardly urged by damping means and operatively associated with a latch device engageable in the forward portion of a load mounted on the frame.

The damping device may include a member mounted on the frame and operatively associated with damping means and engageable with the forward end of the load whereby vertical movements thereof are damped.

Also according to the invention a second kit of parts, which may be used with the first kit of parts when the latter is fitted to a vehicle chassis comprises a load supporting frame having spaced longitudinal frame members, front and rear transomes rigidly connected to the frame members, a fifth wheel pin mounted on a supporting member mounted between the mid portions of the frame members, to engage the fifth wheel plate of the first kit, rollers at the forward ends of the frame members to ride along the longitudinal members of the first frame, retractable ground engaging supports at the forward ends of the frame members, and ground engaging supports at the rear ends of the frame members, the front transom cooperating with the damping device and the rear transom being connected to a member engaging in the guide means of the first kit when the loaded frame is loaded onto the vehicle chassis.

Preferably in the second kit the rear ground engaging supports comprises a pair of road wheels, a pair of arms pivoted to the road wheel axles having limbs connected to shock absorbers and limbs pivoted to frame members fast with the rear transom and forming the member engageable with the guide means.

The vehicle chassis may be provided with shock absorbing means, adjacent the rear road wheels, to be loaded in response to a control associated with the damping device to maintain a substantial equilibrium of the load on the vehicle during normal road travel.

From another aspect, the invention includes a wheeled vehicle chassis, which may be self propelled with an engine for example at one end and a drivers cab with a longitudinal load bearing platform or chassis extending therefrom, and mounted thereon a load receiving assembly made up of parts similar to or the same as the kit of parts of this invention.

The invention also embraces a load carrying structure normally supported above the ground on retractable legs or having one end supported on legs and the other end supported on road wheels, the structure being formed similar to or the same as the second kit of parts of this invention. Moreover, the latter type of vehicle may be adapted to be mounted on a pair of road wheels supporting a fifth wheel plate adapted to be engaged with a kingpin at the end of the structure remote from the road wheels to enable the legs to be retracted. The kingpin at the wheeled fifth plate assembly may be retractable.

BRIEF DESCRIPTION OF THE DRAWINGS.

FIG. 3 is a diagrammatic side view of parts, one on a vehicle chassis the rear part only of which is shown, and the other supporting a load; and, FIG. 4 is a diagrammatic plan view of a rear part of one of the parts shown in FIG. 3.

DESCRIPTION OF PREFERRED EMBODIMENT

Figure 1:
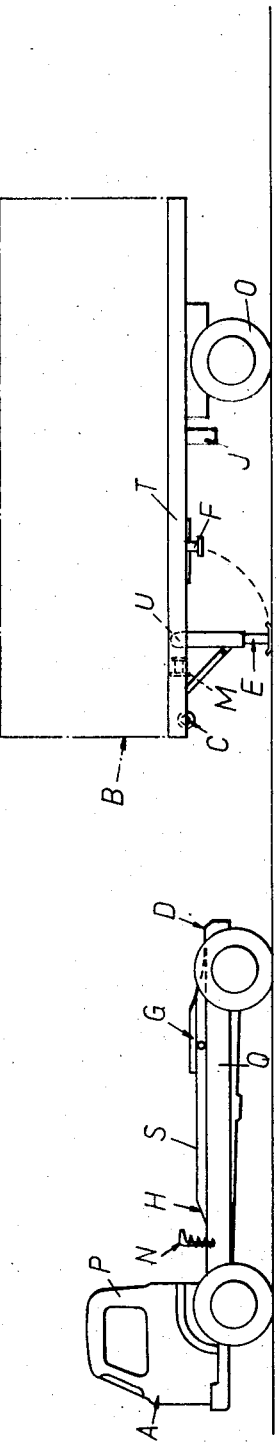
FIG. 1 is a side view showing diagrammatically a side elevation of a vehicle chassis and a raised load to be mounted thereon.
Figure 2:
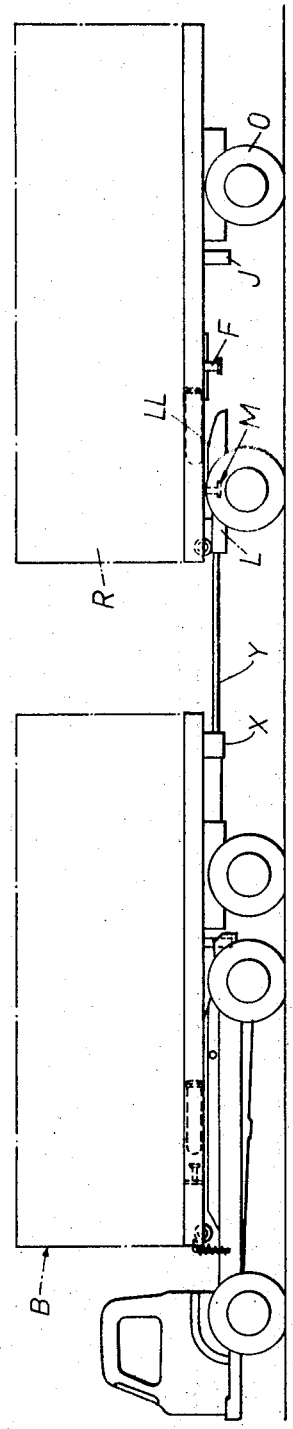
FIG. 2 is a view similar to FIG. 1 with the load mounted on the vehicle chassis and a second raised load supported on a frame having the front end supported by a fifth wheel trailer device and the rear end supported on a pair of road wheels.

Referring to FIG. 1 and the left hand side of FIG. 2, these show a vehicle A and a separate load B mounted on front retractable legs E while the rear is supported on road wheels O. The vehicle A is a conventional load carrying vehicle chassis having a prime mover (e.g. an internal combustion engine, not shown) at the front end with a driver's cab P, the drive from the prime mover being imparted to the front and/or rear road wheels in a conventional manner forming no part of this invention. The vehicle has a rear chassis portion with longitudinal members Q which in the conventional manner extend from the front portion to the rear when they are supported on the rear road wheels as shown. This is a conventional vehicle and may be such as is on the market by any vehicle manufacture and forms no part of this invention.

In FIG. 2 a structure is shown supported at the rear end on road wheels, or it may be supported at the rear on retractable legs similar to the legs E, with its front end supported on the legs E, the structure supporting a load B shown for example as a container in outline.

The vehicle A is shown as having mounted fast thereon an assembly or a kit of parts of the invention (to be described with reference to FIGS. 3 and 4) to enable the vehicle to be reversed beneath the supported structure to the right of FIG. 1 for mounting it on the chassis as shown at the left in FIG. 2.

Mounted on the longitudinal chassis members Q of the vehicle A are a pair of horizontally spaced longitudinal members S reducing in height at H at their front end, and at their rear end having a ramp D, while a fifth wheel coupling plate G is pivotally mounted for fore and aft pitching movement between the members S mid length of the vehicle to receive a kingpin M on the load B.

Referring to the right hand side of FIG. 1 this shows the load B supported on a structure similar to that mounted on the vehicle A with longitudinal frame members T laterally spaced, supported at its front end on legs E which are retractable about the pivot U to the position shown in FIG. 2 of conventional construction. The rear of the members T are shown as supported with suitable suspension (not shown) on road wheels O or on retractable legs similar to the legs E. The forward ends of the members T carry rollers or wheels C and at their mid-length they support, on a transom (not shown) a fifth wheel king pin F. The ramp D has a plate with a central converging slot (to be described) into which a kingpin J, behind the pin F, engages when the load is mounted on the vehicles A. A damping device N is provided at the forward end of the members S.

In operation, with the vehicle A and load B separate one behind the other as in FIG. 1, the vehicle A is reversed under the load R until the wheels C engage the ramp D so that the load is lifted off the ground engaging collapsible legs E placing them in condition to be raised and locked in traveling position. The vehicle is further reversed until the pin F engages the plate G and is locked into position in the usual manner. During the last part e.g. 6 inches or so of movement, the wheels C run off down at H, and also the device J engages in the sides of the slot in the ramp D at rear of the vehicle chassis to align the load centrally and restrain lateral movement of load relative to the chassis, at the rear end. The weight of the load is then supported by the fifth wheel plate G on the vehicle and the rear wheels O on the load. In this position the load is free to tilt backwards and forwards on the fifth wheel plate G allowing oscillation of the rear wheels O on the load, thus keeping the rear wheels on the vehicle in driving contact with the ground while negotiating uneven terrain. The damping device N restrains the oscillation at the front end of the load. The distance from the centre of the plate G to the centre of the rear axle on the vehicle will be such, in relationship to the position of the pin F on the load as to give the correct distribution of weight to all axles in respect of legal requirements when carrying the maximum permissible load.

Referring to FIG. 2 this shows the vehicle A with the load B mounted thereon, the rear wheels O of the load B making the rear wheels of the vehicle A a four wheeled load support. As an example of the loading of the thus loaded vehicle A with a load B of 16 tons (including the weight of the structure supporting the load) the front wheels of the vehicle will be loaded to 5.5 tons, the rear wheels of the vehicle A will be loaded to 7.25 tons and the wheels O will be loaded to 7.25 tons thus being below the permitted limits laid down by the road Licencing Authorities in the United Kingdom.

At the rear of the members S a conventional trailer connection X is secured and FIG. 2 shows a tow bar Y connected thereto for towing a second load R. The load R is originally standing on a pair of legs E shown in the retractable position while it may be supported at the rear on road wheels O as is the load B in FIG. 1. The load R and its supporting structure may be the same as for the load B in FIG. 1. In FIG. 2 the tow bar Y is shown connected at its rear end to a bogie L supporting on its road wheels a fifth wheel plate LL into which a kingpin M similar to the pin F, but at the forward end of the load R is engaged in a conventional fifth wheel arrangement.

To connect the load R for towing, from standing on its legs E, the vehicle A with the tow bar coupled thereto is reversed so that the plate L runs under and lifts the front of the load R until the pin M is engaged in the fifth wheel plate L in the usual manner, thus lifting the front of the load R, off the legs E which are retracted so that the load forms a towed four wheeled trailer.

It will be understood that conventional brake connections, rear light electric cables and like service means are all coupled in conventional manner from the vehicle A to the loads B and R, but this forms no part of the present invention.

Referring to FIGS. 3 and 4, these show a first kit of parts for adapting a standard vehicle chassis, of which the rear part 1 with its rear wheels 2 is shown, for mounting thereon, a load B as in FIG. 1. This kit has a frame including a pair of spaced longitudinal members 3 connected in a conventional manner as by bolts thereto. The members 3 are connected at the front end by a transom 4 and by a ramp having sloping plate 5 at the rear end, the plate 5 having a tapered slot 36. Mid-length of the members 3 they are interconnected by a conventional fifth wheel plate 6a. The forward ends of the members 3 are downwardly sloping at 7 and at the front of these slopes 7 a damping device 8 is arranged.

The damping device 8 has a column 9 mounted by a pivot pin 10 to the members 1 and may be a support for a compressible spring 11 or as shown may be a pair of telescopic members 12 with means to urge them into the extended position e.g. a hydraulic piston cylinder or pneumatic device of conventional form. Pivoted at 13 to the transom 4 is a forwardly ending link 14 the front end of which engages by gravity or preferably by a pivot pin 14' the upper end of the column 9 and engages the top of the spring 11. The forward end of the link 14 has a rearwardly directed hook 15 forming a latch engaging the load as will be described.

A second assembly or kit of parts is provided which forms the supporting structure of the load B. This kit has longitudinal members 16 connected together at their forward ends by a transom 17, a transom 18 at their rear ends, and a transom 19 towards the rear. Mid-length, a cross member 20 supports a kingpin 21. A retracted leg 22 is mounted at each side of the frame formed by the two members 16.

At their forward ends the members 16 each have a roller 23 or wheel disposed to run on the members 3 and the transom 17 has a slot 24 to receive the hook or latch 15.

The transom 19 has extending downwardly therefrom two laterally spaced members 25 to the lower end of which are pivoted at 26 the forward limbs 27 of arms 28 pivoted about the axles 29 of the load rear wheels 30. The rear limbs 31 of the arms 28 are connected to a shock absorbing device 32 which interconnects the limbs 31 and the members 16. At the forward end of the two kits is a detector device 33 which, when the front of the load moves in a vertical direction during travel over uneven terrain, imparts a signal indicative of the change in height and this signal is passed to conventional means to which the shock absorber 32 is responsive causing it to vary its resistance thus balancing the load about the plate 6a.

Where the shock absorber is an hydraulic or pneumatic cushioning device the detector device 33 causes fluid under pressure to be transmitted in a conventional manner to the shock absorber or to the mechanism from a fluid reservoir on the vehicle to control the height of the suspension.

Each of the kit of parts of FIGS. 3 and 4 functions for loading and unloading the load B and/or R onto the vehicle as described with reference to FIGS. 1 and 2.

Between the two members 25 a downwardly extending bar 34 is provided which when the load R is mounted on the vehicle engages the V-shaped slot 36 in the ramp 5 to steady the load. The bar 34 may have a gap at each side of the slot 36 to permit articulation of the vehicle as it rounds a bend in a road and pads 37 may be provided to cushion any contact of the bar 34 with the sides of the slot 36. In addition clamping means 38 may be provided positively to locate the bar 34 in the slot 36. A retractable kingpin 39 may be provided at the forward end of the members 16 so that when they are used with a load R as in FIG. 2 they can engage the fifth wheel coupling plate L in the conventional manner.

For assisting in mounting the load B on the vehicle A jacks are provided in the first kit for mounting on the members 3 and in operation engaging and lifting the members 16 to facilitate movement of the vehicle A beneath the raised load B.

The operation of the shock absorbers 32 tends to maintain the height of the members 16 and hence the load B at a substantially constant height within permitted limits above the grounds.

Thus by means of the invention a conventional vehicle A is capable of picking up and setting down a raised load and may as by means of the right hand end of FIG. 2 pick up and set down a towed load R.

I claim:

1. An assembly for use in converting a wheeled vehicle chassis for mounting thereon trailer loads raised above the ground, said assembly comprising a frame, said frame having spaced longitudinal members mountable longitudinally of said chassis, a fifth wheel coupling plate pivotally mounted between said members in the mid portion thereof for fore and aft pitching movement, load guide means at the rear end of said members, and a damping device at the front end of said frame, said frame enabling the vehicle to be moved longitudinally beneath a raised load until a fifth wheel pin on the mid underside portion of the load engages in said fifth wheel coupling plate and a member at the rear of the load engages in said guide means, and said damping device is engaged in the forward part of said load and reacts against a forward portion of said vehicle chassis.

2. An assembly according to claim 1 wherein said damping device comprises a resilient device securable with respect to said frame and upwardly urged by damping means and operatively associated with a latch device engageable in the forward portion of a load mounted on said frame.

3. An assembly according to claim 1 wherein said damping device includes a member mounted on said frame and operatively associated with damping means and engageable with the forward end of the load whereby vertical movements thereof are damped.

4. A vehicle having a projecting load carrying chassis extending from one end thereof upon which is assembled an assembly enabling said vehicle to be moved longitudinally beneath a raised load to be carried thereby, said assembly comprising a frame having spaced longitudinal members mounted longitudinally of said chassis, a fifth wheel coupling plate pivotally mounted between said members in the mid-portion thereof for fore and aft pitching movement, load guide means at the rear end of said members, and a damping device at the front end of said frame, said frame enabling the vehicle to be moved longitudinally beneath a raised load until a fifth wheel pin on the mid-underside portion of the load engages in said fifth wheel coupling plate with a member at the rear of the load engaged in said guide means, and said damping device is engaged in the forward part of said load and reacts against a forward portion of said vehicle chassis.

5. The vehicle as recited in claim 4 wherein said damping device includes a member mounted on said frame and operatively associated with damping means and engageable with the forward end of the load whereby vertical movements thereof are damped.

6. An assembly for use in converting a wheeled vehicle chassis for mounting thereon trailer loads raised above the ground, said assembly comprising a frame, said frame having spaced longitudinal members mountable longitudinally of said chassis, a fifth wheel coupling plate pivotally mounted between said members in the mid portion thereof for fore and aft pitching movement, load guide means at the rear end of said members, and a damping device at the front end of said frame, said frame enabling the vehicle to be moved longitudinally beneath a raised load until a fifth wheel pin on the mid underside portion of the load engages in said fifth wheel coupling plate and a member at the rear of the load engages in said guide means, and said damping device is engaged in the forward part of said load and reacts against forward portion of said vehicle chassis, a second assembly operably secured with the first assembly when fitted on the vehicle chassis, comprising a load supporting frame, said frame having spaced longitudinal frame members, front and rear transomes rigidly connected to said frame members, a supporting member mounted between the mid portions of said frame members, a fifth wheel pin mounted on said supporting member, to engage the fifth wheel plate of said first assembly, rollers at the forward ends of said frame members to ride along said longitudinal members of said first frame, retracted ground engaging supports at the forward end of said frame members, and ground engaging supports at the rear ends of said frame members, said front transom cooperating with said damping device and said rear transom being connected to a member engaging in said guide means of said first assembly when said loaded frame is loaded onto said vehicle chassis.

7. An assembly according to claim 6 wherein said rear ground engaging supports comprise a pair of road wheels, a pair of arms pivoted to the road wheel axles, limbs of said arms connected to shock absorbers and limbs pivoted to frame members fast with said rear transom and forming said member engageable with said guide means.

* * * * *